United States Patent
Chauhan et al.

(10) Patent No.: US 12,159,454 B2
(45) Date of Patent: Dec. 3, 2024

(54) FALSE TRACK MITIGATION IN OBJECT DETECTION SYSTEMS

(71) Applicant: FORD GLOBAL TECHNOLOGIES, LLC, Dearborn, MI (US)

(72) Inventors: Shubhendra Chauhan, Mountain View, CA (US); Xiufeng Song, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 17/649,114

(22) Filed: Jan. 27, 2022

(65) Prior Publication Data

US 2023/0237793 A1 Jul. 27, 2023

(51) Int. Cl.
| | |
|---|---|
| G06V 10/98 | (2022.01) |
| G06T 7/246 | (2017.01) |
| G06T 7/73 | (2017.01) |
| G06V 20/58 | (2022.01) |

(52) U.S. Cl.
CPC .............. *G06V 10/98* (2022.01); *G06T 7/248* (2017.01); *G06T 7/74* (2017.01); *G06V 20/58* (2022.01)

(58) Field of Classification Search
CPC .......... G06V 10/98; G06V 20/58; G06T 7/74; G06T 7/248
See application file for complete search history.

(56) References Cited

U.S. PATENT DOCUMENTS 8,605,947 B2 * 12/2013 Zhang .................... G08G 1/167
348/148
2007/0255480 A1 * 11/2007 Southall .................... B60T 7/22
701/96
2018/0012078 A1   1/2018 Pournaghi et al.
2019/0146511 A1 *  5/2019 Hurd ...................... B60W 10/18
701/27
2021/0090269 A1 *  3/2021 Troy ...................... G01N 29/265
2022/0082403 A1 *  3/2022 Shapira ............. G01C 21/3822
(Continued)

FOREIGN PATENT DOCUMENTS

CN           106526554 A      3/2017

OTHER PUBLICATIONS

Coherent Change Detection, CCD Vignette from IMSAR, Oct. 13, 2021.

(Continued)

*Primary Examiner* — Pinalben Patel
(74) *Attorney, Agent, or Firm* — Frank A. MacKenzie; Brooks Kushman, P.C.

(57) ABSTRACT

This document discloses system, method, and computer program product embodiments for mitigating the addition of false object information to a track that provides a spatial description of an object, such as a track of radar data or lidar data. The system will analyze two or more frames captured in a relatively small time period and determine whether one or more parameters of an object detected in the frames remain consistent in a specified model. Models that the system may consider include a constant velocity model, a surface model, a constant speed rate model or a constant course rate model. If one or more parameters of the detected object are not consistent over the sequential frames in the specified model, the system may prune the track to exclude one or more of the sequential frames from the track.

18 Claims, 8 Drawing Sheets

(56) References Cited

U.S. PATENT DOCUMENTS

2022/0137207 A1     5/2022   Song et al.
2022/0309792 A1     9/2022   Grundstrom et al.

OTHER PUBLICATIONS

Saho, K., Optimal Steady-State Range Prediction Filter for Tracking with LFM Waveforms, Applied Sciences, 2018, 8:17.
Preiss, M. et al., Coherent Change Detection: Theoretical Description and Experimental Results, Australian Government, Department of Defense, Defence Science and Technology Organization, 2006.
International Search Report and Written Opinion in International Application No. PCT/US2022/080262 dated Apr. 3, 2023, 7 pages.

\* cited by examiner

FALSE TRACK MITIGATION IN OBJECT DETECTION SYSTEMS

BACKGROUND

Object detection systems such as radar sensors, cameras, and light detection and ranging (lidar) systems have many applications. For example, the navigation systems of many vehicles, aircraft, watercraft and robotic systems rely on the data that radar, lidar and/or camera systems generate to identify objects in their path and to plan a trajectory for movement.

Object detection systems, the perception systems into which they are incorporated, or both typically must detect and track multiple objects at any given point in time. For example, when a radar system detects an object, it determines whether to associate the finding with a track (i.e., an object) that the system previously detected, or whether to initiate a new track for the object. However, because radar systems are inherently noisy, the system can sometimes incorrectly consider noise to an object, and it may then associate the false object with an existing track. Incorrect association of a false object with a track can lead to extending a track beyond its true life (i.e., thinking that an object is still being detected when in reality the object no longer appears) and/or the creation of false tracks.

This document describes methods and systems that are directed to addressing the problems described above, and/or other issues.

SUMMARY

In various embodiments, this document describes methods, along with systems and computer program products for implementing the methods, for mitigating the addition of false object information to a track that provides a spatial description of an object. According to the methods a system will access a track comprising a plurality of frames of data captured by a sensor system over a time period, in which each frame of the track comprises spatial data representing a detected object. The system also will analyze a set of at least two sequential frames of the track to determine whether a specified parameter of the detected object remains consistent over the sequential frames in a specified model. In response to the parameter of the detected object not remaining consistent over the sequential frames in the specified model, the system will prune the track to exclude one or more of the sequential frames from the track.

Optionally, the specified model may include a constant velocity model. If so, then when analyzing the set of at least two sequential frames the system may compare a first of the sequential frames and a second of the sequential frames to determine whether the detected object exhibits a position change that does not satisfy the constant velocity model. Alternatively or in addition, when analyzing the set of at least two sequential frames comprises the system may compare a first of the sequential frames and a second of the sequential frames to determine whether the detected object exhibits a change in speed that does not satisfy the constant velocity model. Alternatively or in addition, when analyzing the set of at least two sequential frames the system may compare a first of the sequential frames and a second of the sequential frames to determine whether the detected object exhibits a course change that exceeds a course inconsistency threshold for the specified model.

Optionally, the specified model may include a surface model. If so, then when analyzing the set of at least two sequential frames the system may apply a bounding box to the object in each of a first of the sequential frames and a second of the sequential frames, and the system may then determine that the at least two sequential frames do not satisfy the surface model if a change between a dimension of the bounding box in the first frame and a corresponding dimension of the bounding box in the second frame exceeds an inconsistency threshold for the surface model, otherwise the system may determine that the at least two sequential frames do satisfy the surface model.

Optionally, the specified model may include a constant speed rate model and the specified parameter may include a rate of change in speed of the object. If so, then when analyzing the set of at least two sequential frames the system may access at least three sequential frames of the track and calculate the rate of change in speed of the object over the at least three sequential frames. The system may determine that the specified parameter remains consistent over the at least three sequential frames if the rate of change in speed of the object over the at least three sequential frames is less than a speed rate inconsistency threshold; otherwise, the system may determine that the specified parameter does not remain consistent over the at least three sequential frames.

Optionally, the specified model may include a constant course rate model and the specified parameter may include a course rate of the object. If so, then when analyzing the set of at least two sequential frames the system may access at least three sequential frames of the track and calculating the course rate of the object over the at least three sequential frames. The system may determine that the specified parameter remains consistent over the at least three sequential frames if the course rate of the object over the at least three sequential frames is less than a speed rate inconsistency threshold; otherwise, the system may determine that the specified parameter does not remain consistent over the at least three sequential frames.

Optionally, the specified model may comprise a constant velocity model, a surface model, a constant speed rate model, and a constant course rate model. If so, then when analyzing the set of at least two sequential frames and pruning the track the system may determine whether a plurality of specified parameters of the detected object remain consistent over the sequential frames in the constant velocity model and the surface model. If the specified parameters of the detected object remain do not remain consistent over the sequential frames in the constant velocity model and the surface model, then in response the system may prune the track to exclude one or more of the sequential frames from the track. Otherwise, the system may determine whether a plurality of specified parameters of the detected object remain consistent over the sequential frames in the constant course rate model and the constant speed rate model. When the specified parameters of the detected object do not remain consistent, the system may then prune the track to exclude one or more of the sequential frames from the track.

Optionally, the sensor system may be a perception system of an autonomous vehicle. The perception system may be configured to capture the sensor data as one or more of the following: radar data, lidar data or camera data.

When pruning the track to exclude the one of the sequential frames from the track, the system will either (a) modify the track to delete the excluded one or more frames from the track, or (b) remove the excluded frame from a data stream of the data captured by the sensor system before the excluded one or more frames are saved to the track. In either situation, when excluding the one or more frames, the system may start with a most recent frame.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

This document describes system, apparatus, device, method and/or computer program product embodiments, and/or combinations and sub-combinations of any of the above, for reducing the life of falsely detected objects in object detection systems (such as radar, lidar, and camera systems).

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

Definitions for additional terms that are relevant to this document are included at the end of this Detailed Description.

This document describes the present solution in the example context of an autonomous vehicle ("AV") and a radar system. However, the present solution is not limited to AV applications and radar systems. The present solution may be used in other applications that use object detection systems such as other robotic systems: non-autonomous ground, air or water vehicles; premises security systems; and other applications. The present solution may be used in connection with other object detection systems such light detection and ranging (lidar) systems, laser detection and ranging (LADAR) systems, sound navigation and ranging (sonar) systems, cameras, and other systems or combinations of systems that can detect objects that are within range of the systems' sensors.

Figure 1:
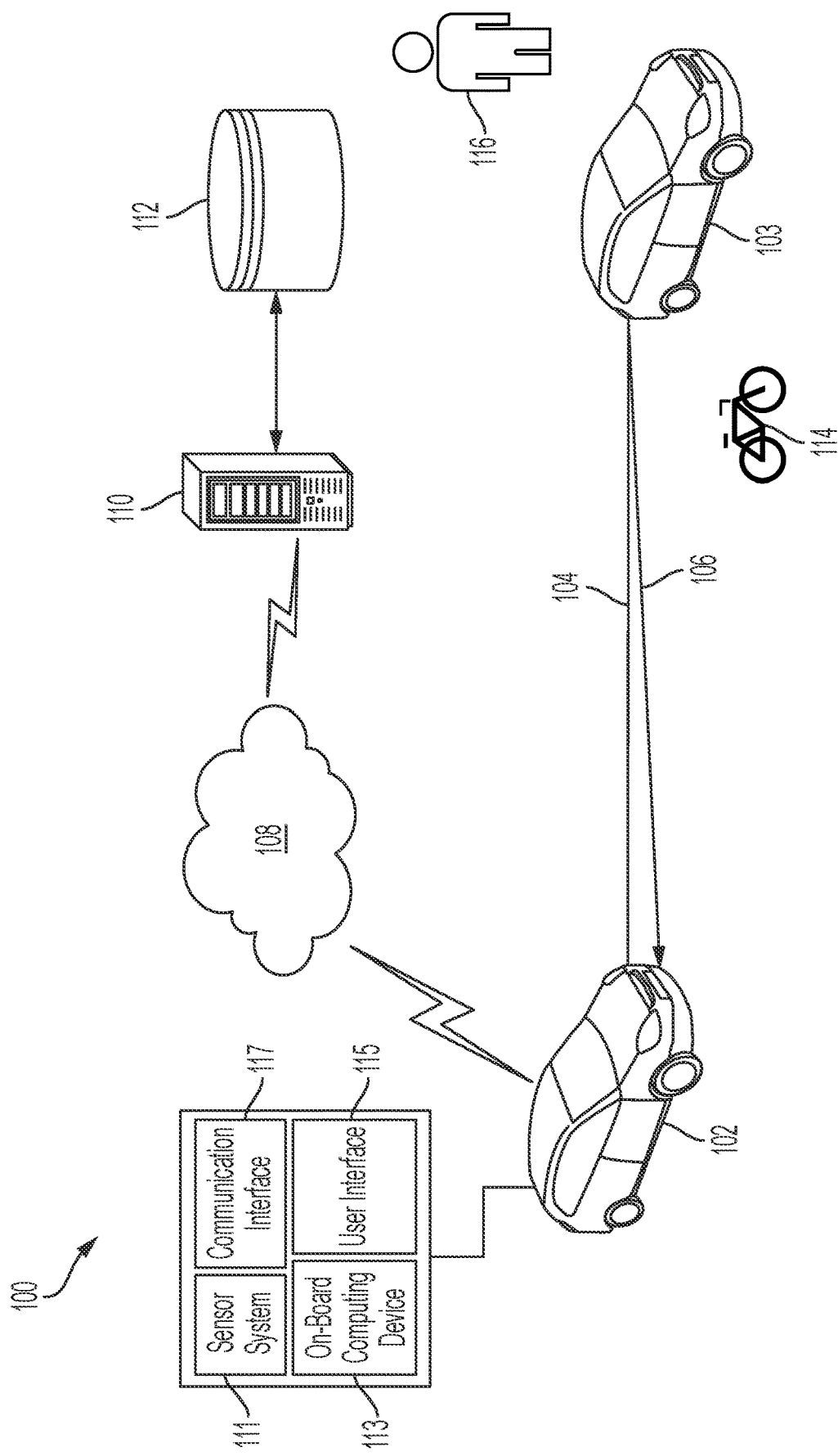
FIG. 1 illustrates an example autonomous vehicle system, in accordance with aspects of the disclosure.

FIG. 1 illustrates an example system 100, in accordance with aspects of the disclosure. System 100 comprises a vehicle 102 that is traveling along a road in a semi-autonomous or autonomous manner. This document may refer to vehicle 102 as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 has an object detection system that is generally configured to detect objects in its proximity. The objects can include, but are not limited to, a vehicle 103, cyclist 114 (such as a rider of a bicycle, electric scooter, motorcycle, or the like) and/or a pedestrian 116.

The object detection system of the AV 102 may include a sensor system 111, an on-board computing device 113, a communications interface 117, and optionally a user interface 115. Autonomous vehicle system 101 may further include certain components (as illustrated, for example, in FIGS. 6 and 7) included in vehicles, which may be controlled by the on-board computing device 113 using a variety of communication signals and/or commands, such as, for example, acceleration signals or commands, deceleration signals or commands, steering signals or commands, braking signals or commands, etc.

The sensor system 111 may include one or more sensors such as, without limitation, a lidar system, a radar system, a LADAR system, a sonar system, one or more cameras (for example, visible spectrum cameras, infrared cameras, monocular cameras, stereo cameras, depth cameras, etc.), temperature sensors, position sensors (for example, a global positioning system (GPS), etc.) and the like. The system also may include other sensors that do not directly detect objects, such as location sensors, fuel sensors, humidity sensors, occupancy sensors, and sensors that detect motion of the vehicle (for example, an inertial measurement unit (IMU), etc.). The data captured by these sensors can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface. This document may refer to such data interchangeably as "perception data" or "object detection data".

The AV 102 may also communicate sensor data collected by the sensor system to a remote computing device 110 (for example, a cloud processing system) over communications network 108. Remote computing device 110 may be configured with one or more servers to process one or more processes of the technology described in this document. Remote computing device 110 may also be configured to communicate data/instructions to/from AV 102 over network 108, to/from server(s) and/or database(s) 112.

If the object detection system is a lidar or radar system, then the object detection system may be configured to transmit a pulse 104 to detect objects located within a distance or range of distances of AV 102. The transmitted pulse 104 may be a light pulse from a lidar system, a sonic pulse from a sonar system, a laser pulse from a LADAR system, or other types of pulses that are available from the object detection system. Transmitted pulse 104 may be incident on one or more objects (such as vehicle 103) and be reflected back to the lidar system. Reflected pulse 106 incident on the system may be processed to determine a distance of that object 103 to AV 102. The reflected pulse may be detected using, in in the case of light pulses, a photodetector or array of photodetectors positioned and configured to receive the light reflected back into the lidar system. In the case of radar system, the radar emitter emits radio frequency energy, and a radar detector such as an antenna detects the energy after the energy is reflected back from the object. Detected object data is communicated from the object detection system to an on-board computing device, such as on-board computing device 220 of FIG. 2. The AV 102 may also communicate object detection data to a remote computing device 110 over communications network 108.

It should be noted that the object detection systems may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102 and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 117 over communication links such as those known as vehicle-to-vehicle, vehicle-to-object or other V2X communication links. The term "V2X" refers to a communication between a vehicle and any object that the vehicle may encounter or affect in its environment.

As noted in the Background section above, because of noise or other factors, object detection systems sometimes detect a false object and associate the falsely detected object with an existing object track. A "track" is a data set of information about an object that is detected by a perception system over a period of time. A "frame" is a subset of a track containing data captured during an epoch that is smaller than that of the overall track. Track information (and, by extension, frame information) may include spatial information about the object such as the object's position, speed, pose, trajectory, surface model, and/or other information. Incorrect association of a false object with a track can lead to extending a track beyond its true life and/or the creation of false tracks. In addition, if a false or incorrect track is published to other systems or subsystems, such as a motion planning system of a vehicle, it can degrade the quality of actions that the other systems or subsystems take based on processing the track data. For example, an AV's motion planning system may take action to avoid a false object that is present in a track, but which is not actually present in the real-world environment. This document describes methods and systems by which an object detection system may process data in an object track, detect inconsistencies in track data that may suggest association of a false object into the track, and prune false data from object tracks before such data is used by motion planning systems or other systems.

Figure 2A:
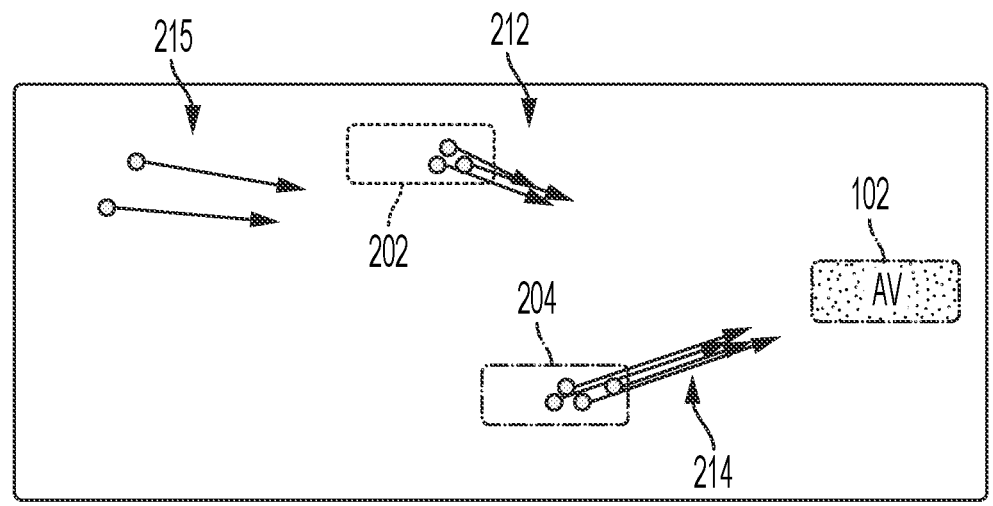
FIGS. 2A and 2B illustrate an example object detection system data pipeline.
Figure 2B:
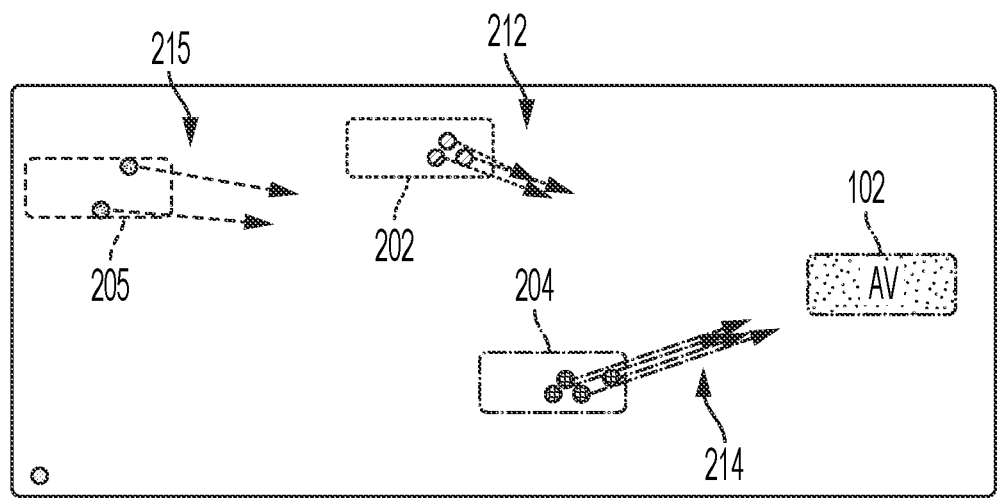

FIGS. 2A and 2B illustrate an example object detection system data pipeline, which in this case uses radar data by way of example. In FIG. 2A, a radar system of an AV 102 has received various raw radar detections 212, 214, 215, each of which is represented by a dot-and-arrow shape. The individual radar detections within each group of radar detections 212, 214, 215 are consistent with each other in terms of location and/or other characteristics. The system has initiated tracks 202 and 204 for previously-detected objects. Radar detections 212 appear in the location of existing object track 202, so the system associates radar detections 212 with object track 202. Similarly, radar detections 214 appear in the location of existing object track 204, so the system associates radar detections 214 with object track 204. However, while the individual detections of radar detections 215 are consistent with each other, they are not consistent with any existing track. Therefore, referring to FIG. 2B, the system initializes a new track 205 for radar detections 215, representing a new object.

Figure 3:
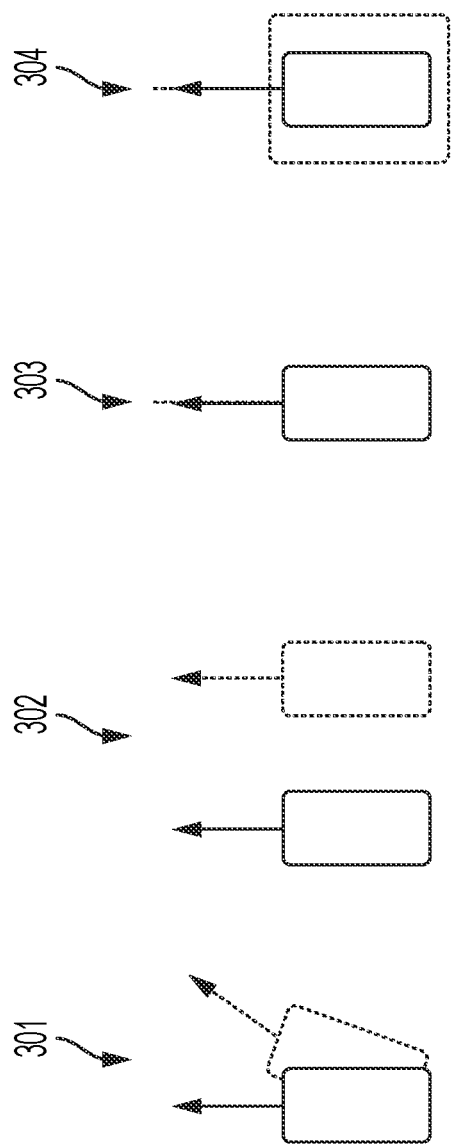
FIG. 3 illustrates various types of object behavior inconsistencies that an object detection system may discover.

FIG. 3 illustrates examples of various types of object behavior inconsistencies that the system may detect. In each example, the rectangular box represents an object, and the arrow extending from the box represents the object's direction of movement. The length of the arrow represents the speed of the object, with a relatively longer arrow corresponding to relatively higher speed. Solid lines represent track states detected for objects at an instant in time k, while dotted lines represent track states detected for objects at a later instant in time k+1. The track states of example 301 show inconsistent course, as the detected object has suddenly veered toward a different trajectory at the next time instant k+1. The track states of example 302 show inconsistent pose, as the detected object has a sudden, significant change in position at time k+1. The track states of example 303 show inconsistent pose, as the detected object has a sudden, significant increase in speed at time k+1. The track states of example 304 show an inconsistent surface model, as the detected object has a significantly different shape or spatial area at time k+1.

Figure 4:
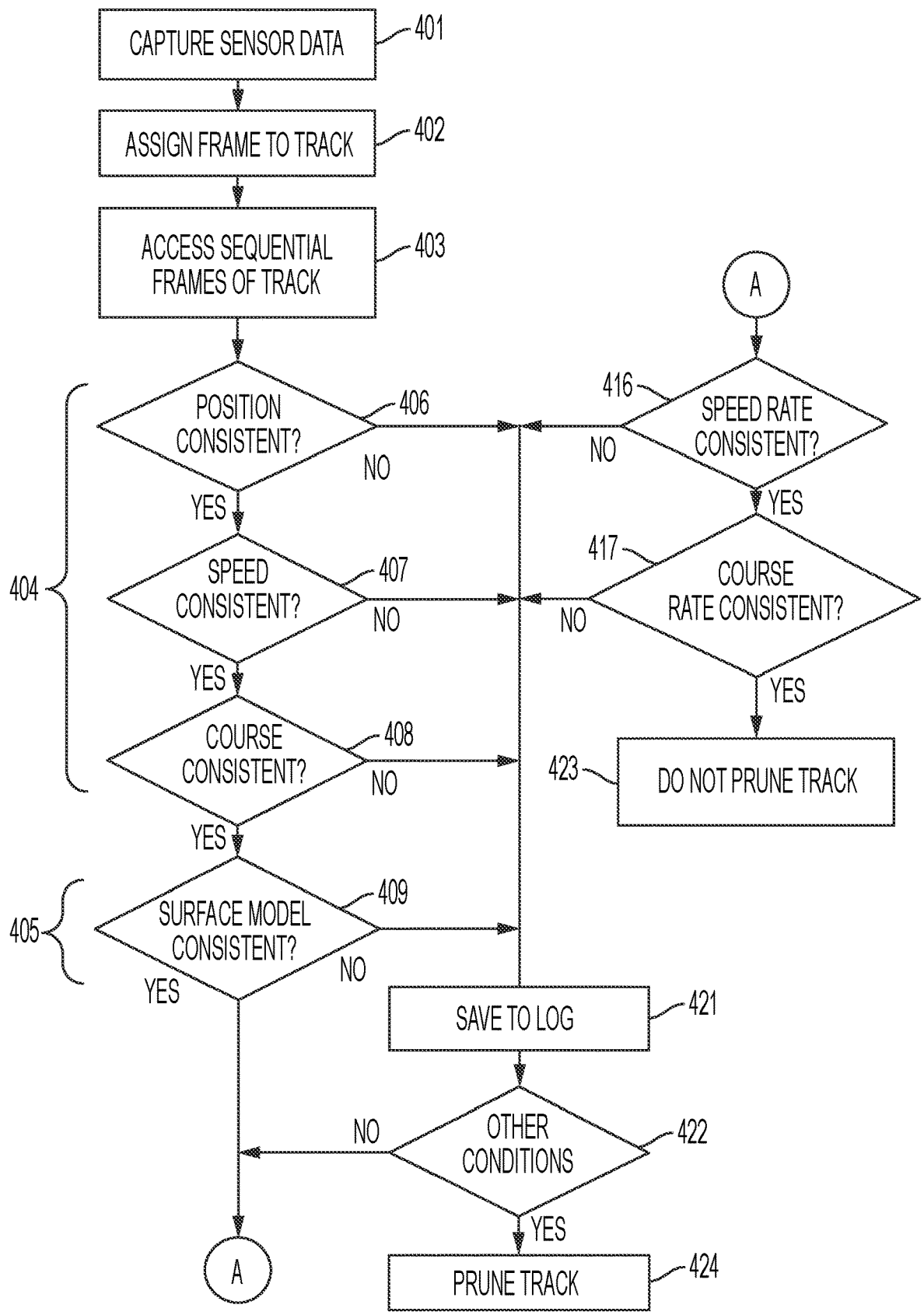
FIG. 4 is a flow diagram that illustrates a process by which a processor may detect and mitigate false track information in object detection systems.

FIG. 4 illustrates a process by which a processor may detect and mitigate false track information in object detection systems. The processor may be onboard a vehicle as the vehicle is making a run and detecting information about its environment. Alternatively, the processor may be an off-board processor that receives data captured by a vehicle's sensor system as the vehicle captured it, or at a later time. In other embodiments, the processor may be a local or remote processor that receives sensor data captured by a security system, a robotic system, or other system having object detection sensors. At 401 the object detection system captures the sensor data. The system may group the data into frames, in which each frame represents a period of time that the sensor system was operating. The object detection system that captures the sensor data may be a radar system that captures radar data, a lidar system that captures lidar data, a stereo camera system or other camera system that captures camera data, or other sensor systems.

At 402 a processor analyzes the sensor data. When the processor detects an object in the data, it either associates the frame with an existing track for the object or, if no track exists for the object, generates a new track and associates the frame to the new track. Any now or hereafter known object detection methods may be used, including but not limited to those discussed below in the context of FIG. 6.

At 403 the processor will access one of the tracks, which may be stored in a memory and/or streamed in real time as new frames arrive. The track will include a sequence of frames of data captured by the sensor system over a time period, in which each frame of the track comprises spatial data representing a detected object. The sequence may include an uninterrupted sequence (that is, a first frame, its immediate next frame, etc.), or a sample set including every other frame or every third frame in the sequence or some other subset of the entire sequence.

The system then analyzes the sequential frames to look for first order inconsistencies and/or second order inconsistencies in the track information, in which each inconsistency is associated with a specified motion model or behavior model. These are illustrated in FIG. 2, where the first order inconsistencies are shown on the left side of the chart (steps 406-409), and the second order inconsistencies are shown on the right side of the chart (steps 416-417). The specified models for the first level inconsistencies include a constant velocity model (which is a motion model) and a surface model (which is a behavior model), and the first level inconsistencies look at differences in object characteristics for at least two frames. The specified models for the second level inconsistencies include a constant course rate model and a constant speed rate model, and the second level inconsistences consider object characteristics over at least three frames. The sets of at least two frames or at least three frames may be consecutive frames, or they may be non-consecutive but selected from groups of frames captured during a limited, small period of time. These steps will be described in detail below.

In the first order inconsistency assessment, at each of steps 406-409 the system will analyze a set of at least two sequential frames of the track to determine whether a specified parameter of the detected object remains consistent over the sequential frames in a specified model. If the parameter of the detected object does not remain consistent over the sequential frames in the specified model, then at 424 the system may prune the track to exclude one or more of the sequential frames from the track and thus avoid subsequent usage of the track in other modules.

One parameter of the object for which the system may examine consistency in the first order inconsistency assessment is the object's position in the constant velocity model 404. To do this, at 406 the system may examine whether, between a first of the sequential frames and a second of the sequential frames, the detected object exhibits a position change that satisfies a constant velocity model. The system may measure the object's position by, for example, drawing a bounding box around the object and determining the coordinates of the position to be a centroid of the bounding box. The system may do this by measuring whether position inconsistency (i.e., the difference in position of the object) between two frames ($t_1$ and $t_2$) of a given track exceeds a position inconsistency threshold, using an equation set that determines whether:

$$|x_{t_1} - x_{t_2} - v_{t_1}^x \Delta t_1| > \epsilon_x,$$

$$|y_{t_1} - y_{t_2} - v_{t_1}^y \Delta t_1| > \epsilon_y, \text{ and/or}$$

$$|x_{t_1} - x_{t_2} - v_{t_1}^x \Delta t_1| > \epsilon_z.$$

In the equation set above: (x, y, z) denotes the position of the object in the applicable frame; ($v^x$, $v^x$, $v^z$) is the velocity of the object in the applicable frame; $\Delta t_1 = t_2 - t_1$ is the time difference between the two frames; the subscript $t_i$ denotes the state value at the $i^{th}$ frame; and ($\epsilon_x$, $\epsilon_y$, $\epsilon_z$) is the predefined position inconsistency threshold for each axis. If the measured position inconsistency for any of the equations in the equation set exceeds the predetermined threshold (406: NO), then the position change will not satisfy the constant velocity model and the system may consider that track to be inconsistent and it will prune one or more of the frames at 424. (Note: the discussion above presumes that three-dimensional data is available. However, the same process can be used with two-dimensional data reflecting only x and y positions.)

Another parameter of the object for which the system may examine consistency in the first order inconsistency assessment is the object's speed in the constant velocity model 404. To do this, at 407 the system may examine whether, between a first of the sequential frames and a second of the sequential frames, the detected object exhibits a speed change that satisfies the constant velocity model. The system may do this by measuring whether speed inconsistency (i.e., a difference in speeds of the object) between two frames ($t_1$ and $t_2$) of a given track exceeds a speed inconsistency threshold, using an equation that determines whether:

$$|\|v_{t_2}\| - \|v_{t_1}\|| > \epsilon_v.$$

In the equation above, $v_{t_i}$ denotes the velocity of the object in the frame associated with time i, $\|\cdot\|$ denotes the L2 norm and $\epsilon_v$ is the predefined speed inconsistency threshold. If the measured speed inconsistency exceeds the predetermined threshold (407: NO), then the speed change will not satisfy the constant velocity model and the system may prune one or more of the frames (such as the most recent frame) from the track at 424.

Another parameter of the object for which the system may examine consistency in the first order inconsistency assessment is the object's course in a constant velocity model 405. To do this, at 408 the system may examine whether, between a first of the sequential frames and a second of the sequential frames, the detected object exhibits a course change that satisfies the constant velocity model. The system may do this by measuring whether course inconsistency (i.e., a difference in courses of the object) between two frames ($t_1$ and $t_2$) of a given track exceeds a course inconsistency threshold, using an equation that determines whether:

$$\|\theta_{t_2} - \theta_{t_1}\| > \epsilon_\theta.$$

In the equation above, $\theta_{t_i}$ denotes the course of the object in the frame associated with time i, and $\epsilon_\theta$ is the predefined course inconsistency threshold. If the measured course inconsistency exceeds the predetermined threshold (408: NO), then the course change will not satisfy the constant velocity model and the system may prune one or more of the frames (such as the most recent frame) from the track at 424.

Another parameter of the object for which the system may examine consistency in the first order inconsistency assessment is the object's surface model (which is also a behavior model 405). The surface model is an approximation of the object's overall surface, generalized from sample data. An example surface model may be in the form of a two-dimensional (2D) bounding box. To examine consistency of the object's surface model, at 409 the system may apply a 2D bounding box to the object in each frame and examine whether, between a first of the sequential frames and a second of the sequential frames, the 2D bounding box exhibits a change in size that exceeds a surface model inconsistency threshold, using an equation that determines whether:

$$|l_{t_2} - l_{t_1}| > \epsilon_l, \text{ or}$$

$$|w_{t_2} - w_{t_1}| > \epsilon_w$$

In the equation above, (l, w) is the length and width of the bounding box, and ($\epsilon_l$, $\epsilon_w$) is the surface model inconsistency threshold. Optionally, the system may consider the surface model to exceed the threshold if: (a) both the length and the width differences exceed predetermined corresponding length and width inconsistency thresholds; (b) either the length or the width difference exceeds a predetermined corresponding length or width inconsistency threshold; and/or (c) if a function (such as the sum) of the length and width inconsistencies exceeds an overall surface model inconsistency threshold value. If any measured surface model inconsistency exceeds any of the surface model thresholds (409: NO), then the surface will not be consistent with the constant surface model requirement and the system may prune one or more of the frames (such as the most recent frame) from the track at 424. Note that the example above used a 2D image and a 2D bounding box using only x, y camera data, but the system may use a similar process with 3D image data that also includes a height dimension.

If the specified parameters of the detected object remain do not remain consistent over the sequential frames in the constant velocity model or the surface model (i.e., in the first order), then at 424 the system may prune the track to exclude one or more of the frames from the track. However, if the parameters of the detected object remain consistent over the first order, the system will then assess whether any of the second order inconsistencies exist. As noted above, while the first order inconsistencies consider at least two frames of data, the second order inconsistencies consider at least three frames of data.

One parameter of the object for which the system may examine consistency in the second order inconsistency assessment is the object's speed rate at 416. In a constant speed rate model, the object's rate of change of speed should remain approximately constant. This can be determined by calculating the object's rate of change in speed over the three frames and determining whether:

$$(s_{t_2} - s_{t_1})/\Delta t_1 \approx (s_{t_3} - s_{t_2})/\Delta t_2, \text{ or}$$

$$(s_{t_2} - s_{t_1})\Delta t_2 \approx (s_{t_3} - s_{t_2})\Delta t_1.$$

In the equation set above: s denotes speed of the object; $\Delta t_1 = t_2 - t_1$ is the time difference between frames ($t_1$, $t_2$); and $\Delta t_2 = t_3 - t_2$ is the time difference between frames ($t_2$, $t_3$). A track will exhibit speed rate inconsistency (416: NO) if the following condition is met:

$$\|(s_{t_2} - s_{t_1})\Delta t_2| - |(s_{t_3} - s_{t_2})\Delta t_1\| > \epsilon_s,$$

where $\epsilon_s$ is a predefined speed rate inconsistency threshold. If the speed rate exceeds the threshold (416: NO), then the rate of change of the speed will not satisfy the constant speed rate model and the system may prune one or more of the frames (such as the most recent frame) from the track at 424.

Another parameter of the object for which the system may examine consistency in the second order inconsistency assessment is the object's course rate at 417. In a constant course rate model, the object's course rate should remain approximately constant over a relatively short time, and should not suddenly change. The system can assess this by determining whether the following inequality is satisfied:

$$\|(\theta_{t_2} - \theta_{t_1})\Delta t_2| - |(\theta_{t_3} - \theta_{t_2})\Delta t_1\| > \epsilon_{\theta_{rate}},$$

where $\epsilon_{\theta_{rate}}$ is a predefined course rate inconsistency threshold. If the course rate exceeds the threshold (417: NO), then the rate of change of the speed will not satisfy the constant course rate model and the system may prune one or more of the frames (such as the most recent frame) from the track at 424.

As noted above, pruning a track (step 424) may include either modifying the track to delete an excluded frame from the track (for example by starting backward from the most recent frame), or removing the excluded frame from a data stream of the data captured by the sensor system before the excluded frame is saved to the track. Optionally, before or when pruning a track, at 421 the system may save the track to a list or other data set of inconsistent tracks. In addition, at 422 before pruning the track the system may determine whether any other conditions have been satisfied, and it will only prune the track at 424 if one or more of the other conditions have been satisfied. For example, for some or all of the parameters, the system may only prune the track if more than a threshold number of parameters are satisfied.

Figure 5A:
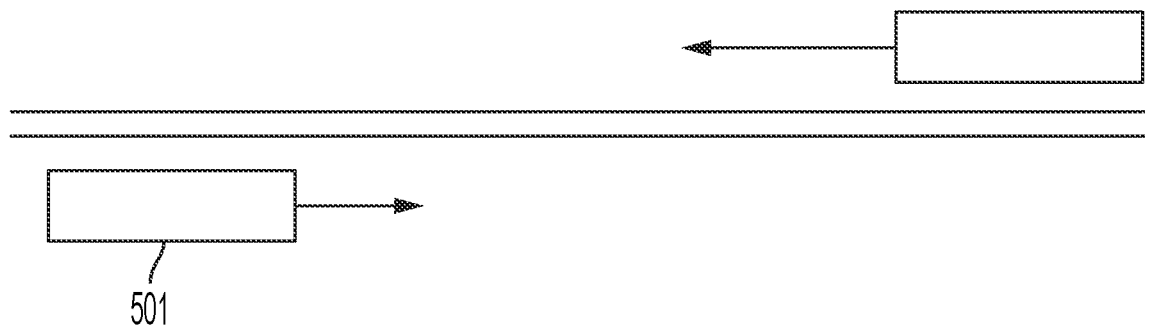
FIGS. 5A-5C illustrate three frames of an example track and show various parameter inconsistencies.
Figure 5B:
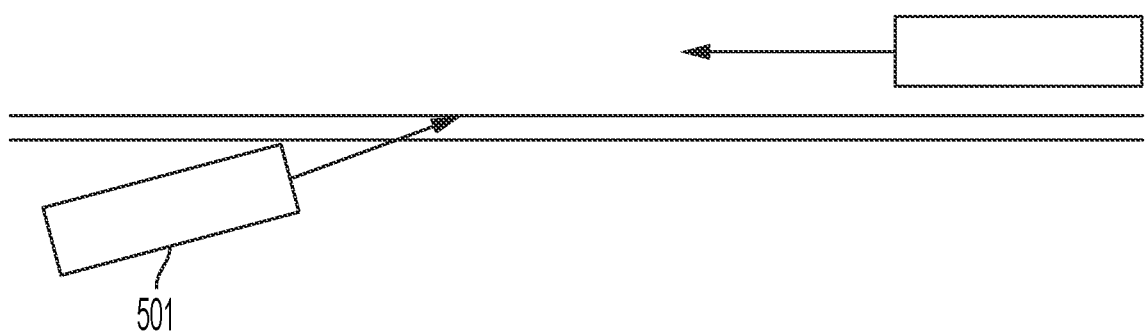
Figure 5C:
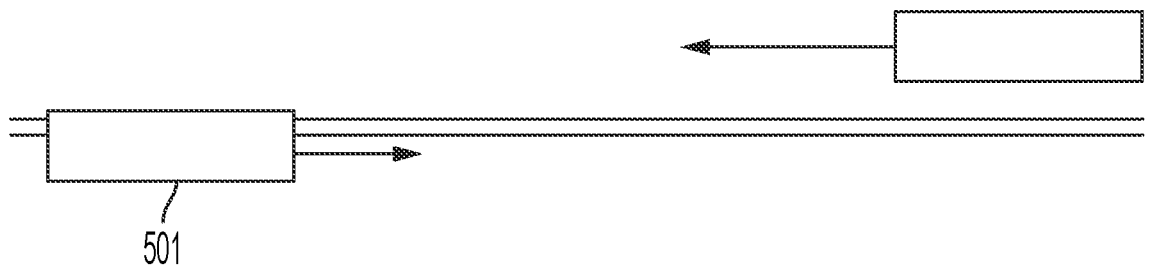

FIGS. 5A-5C illustrate examples of radar track frames to show how an object may exhibit inconsistent behavior over the frames. In each frame, the object 501 is represented by a bounding box. An arrow extends from the box and points in the object's direction of movement (i.e., its course). The length of the arrow represents the object's speed. FIG. 5A is the first frame in the sequence and thus serves as the reference frame at time $t_1$.

In FIG. 5B, at time $t_2$ the object 501 exhibits a sudden change in course. This course jump is inconsistent with the object's course in the prior frame, so the system may consider object 501 in the frame of FIG. 5B to be a false object.

In FIG. 5C, at time $t_3$ the object 501 exhibits a sudden change in position. This position jump is inconsistent with the object's position in the prior frame, so the system many consider object 501 in either the frame of FIG. 5A or the frame of FIG. 5B to be a false object, or it may analyze additional frames and prune the frame or frames that are outliers and not consistent with most other frames in the sequence.

Figure 6:
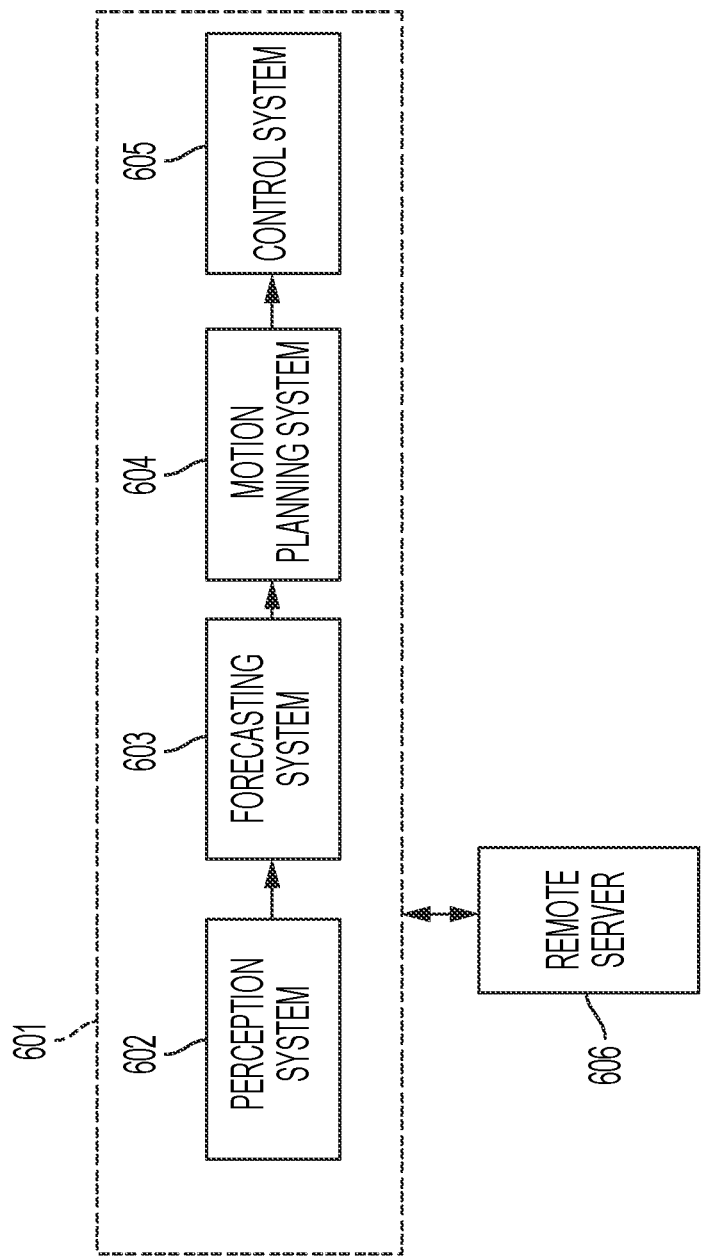
FIG. 6 is a block diagram that illustrates various high-level systems of an autonomous vehicle.

FIG. 6 shows a high-level overview of vehicle subsystems that may be relevant to the discussion above. Specific components within such systems will be described in the discussion of FIG. 7 later in this document. Certain components of the subsystems may be embodied in processor hardware and computer-readable programming instructions that are part of the vehicle on-board computing system 601.

The subsystems may include a perception system 602 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 602 may deliver perception data to the vehicle's forecasting system 603. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 604 and motion control system 605 so that the receiving systems may assess such data and initiate any number of reactive motions to such data. The motion planning system 604 and control system 605 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 604 may be embodied in processor hardware and computer-readable hardware that are part of an electronic devices that is contained with the vehicle, such as an dashboard navigation system or a mobile electronic device of the operator. In such situations, the electronic device may output the trajectories planned by the motion planning system via a display, an audio speaker, or both. In addition, some parts of the perception system 602 may include a transceiver of an electronic device that receives certain perception data (such as weather data) from a remote server via wireless communication.

The vehicle's on-board computing system 601 will be in communication with a remote server 606. The remote server 606 is an external electronic device that is in communication with the vehicle's on-board computing system 601, either via a wireless connection while the vehicle is making a run, or via a wired or wireless connection while the vehicle is parked at a docking facility or service facility. The remote server 606 may receive data that the vehicle collected during its run, such as perception data and operational data. The remote server 606 also may transfer data or other information to the vehicle such as software updates, high definition (HD) map updates, machine learning model updates and other information.

Figure 7:
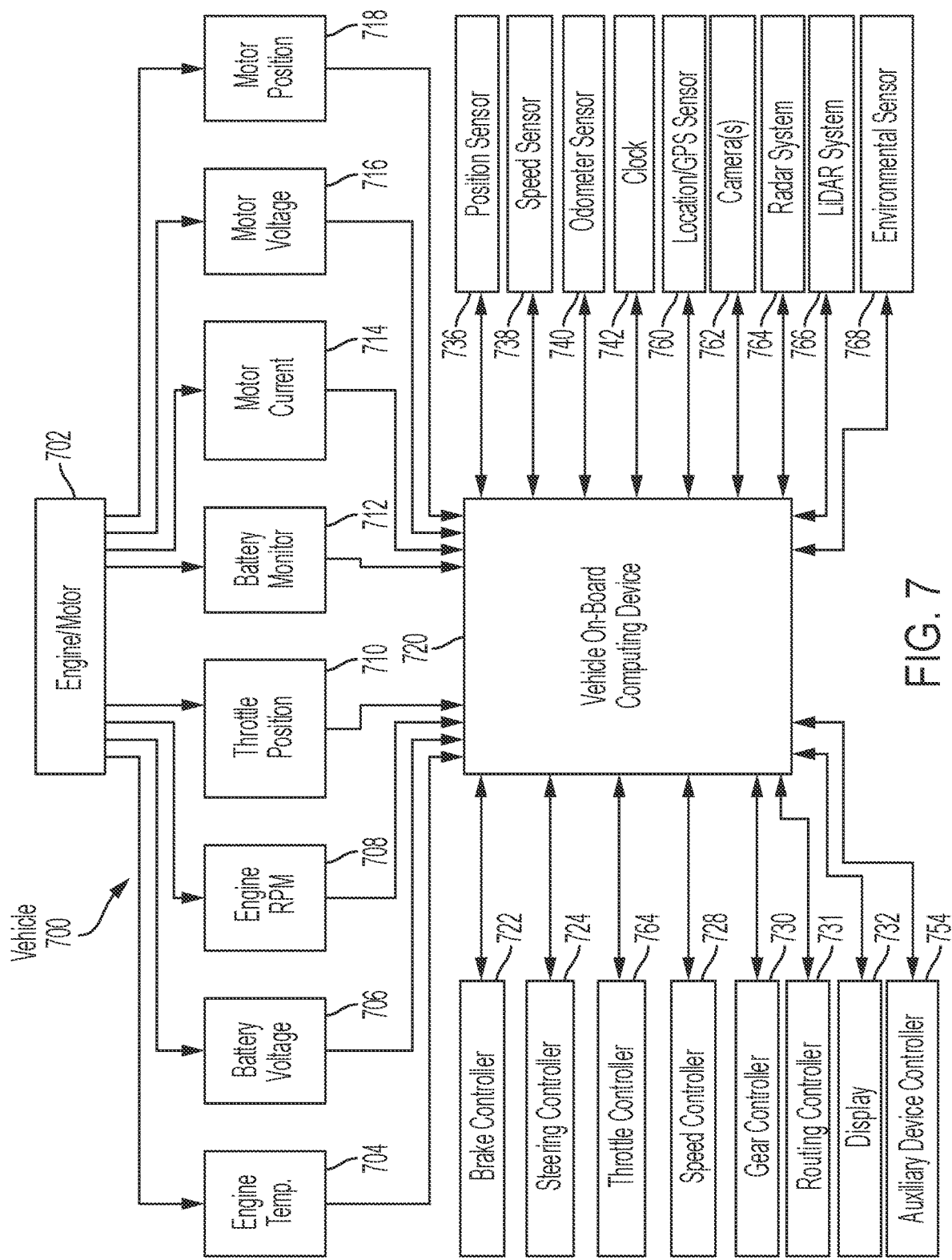
FIG. 7 illustrates an example architecture for a vehicle, in accordance with aspects of the disclosure.

FIG. 7 illustrates an example system architecture 700 for a vehicle, in accordance with aspects of the disclosure. Vehicle 102 of FIG. 1 can have the same or similar system architecture as that shown in FIG. 7. Thus, the following discussion of system architecture 700 is sufficient for understanding vehicle 102 of FIG. 1. However, other types of vehicles are considered within the scope of the technology described in this document and may contain more or less elements as described in association with FIG. 7. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 7, system architecture 700 for a vehicle includes an engine or motor 702 and various sensors 704-718 for measuring various parameters of the vehicle. In gas-powered or hybrid vehicles having a fuel-powered engine, the sensors may include, for example, an engine temperature sensor 704, a battery voltage sensor 706, an engine rotations per minute ("RPM") sensor 708, and a throttle position sensor 710. If the vehicle is an electric or hybrid vehicle, then the vehicle may have an electric motor, and accordingly includes sensors such as a battery monitoring system 712 (to measure current, voltage and/or temperature of the battery), motor current 714 and voltage 716 sensors, and motor position sensors 718 such as resolvers and encoders.

Operational parameter sensors that are common to both types of vehicles include, for example: a position sensor 736 such as an accelerometer, gyroscope and/or inertial measurement unit; a speed sensor 738; and an odometer sensor 740. The vehicle also may have a clock 742 that the system uses to determine vehicle time during operation. The clock 742 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 760 (such as a Global Positioning System ("GPS") device); object detection sensors such as one or more cameras 762; a lidar system 764; and/or a radar and/or a sonar system 766. The sensors also may include environmental sensors 768 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 720. The on-board computing device 720 may be implemented using the computer system of FIG. 8. The vehicle on-board computing device 720 analyzes the data captured by the sensors and optionally controls operations of the vehicle based on results of the analysis. For example, the vehicle on-board computing device 720 may control: braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers. Auxiliary device controller 754 may be configured to control one or more auxiliary devices, such as testing systems, auxiliary sensors, mobile devices transported by the vehicle, etc.

Geographic location information may be communicated from the location sensor 760 to the on-board computing device 720, which may then access a map of the environment that corresponds to the location information to determine known fixed features of the environment such as streets, buildings, stop signs and/or stop/go signals. Captured images from the cameras 762 and/or object detection information captured from sensors such as lidar system 764 is communicated from those sensors) to the on-board computing device 720. The object detection information and/or captured images are processed by the on-board computing device 720 to detect objects in proximity to the vehicle. Any known or to be known technique for making an object detection based on sensor data and/or captured images can be used in the embodiments disclosed in this document.

Lidar information is communicated from lidar system 764 to the on-board computing device 720. Additionally, captured images are communicated from the camera(s) 762 to the vehicle on-board computing device 720. The lidar information and/or captured images are processed by the vehicle on-board computing device 720 to detect objects in proximity to the vehicle. The manner in which the object detections are made by the vehicle on-board computing device 720 includes such capabilities detailed in this disclosure.

In addition, the system architecture 700 may include an onboard display device 732 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 720 may include and/or may be in communication with a routing controller 731 that generates a navigation route from a start position to a destination position for an autonomous vehicle. The routing controller 731 may access a map data store to identify possible routes and road segments that a vehicle can travel on to get from the start position to the destination position. The routing controller 731 may score the possible routes and identify a preferred route to reach the destination. For example, the routing controller 731 may generate a navigation route that minimizes Euclidean distance traveled or other cost function during the route, and may further access the traffic information and/or estimates that can affect an amount of time it will take to travel on a particular route. Depending on implementation, the routing controller 731 may generate one or more routes using various routing methods, such as Dijkstra's algorithm, Bellman-Ford algorithm, or other algorithms. The routing controller 731 may also use the traffic information to generate a navigation route that reflects expected conditions of the route (e.g., current day of the week or current time of day, etc.), such that a route generated for travel during rush-hour may differ from a route generated for travel late at night. The routing controller 731 may also generate more than one navigation route to a destination and send more than one of these navigation routes to a user for selection by the user from among various possible routes.

In various embodiments, the on-board computing device 720 may determine perception information of the surrounding environment of the AV 102. Based on the sensor data provided by one or more sensors and location information that is obtained, the on-board computing device 720 may determine perception information of the surrounding environment of the AV 102. The perception information may represent what an ordinary driver would perceive in the surrounding environment of a vehicle. The perception data may include information relating to one or more objects in the environment of the AV 102. For example, the on-board computing device 220 may process sensor data (e.g., lidar or radar data, camera images, etc.) in order to identify objects and/or features in the environment of AV 102. The objects may include traffic signals, roadway boundaries, other vehicles, pedestrians, and/or obstacles, etc. The on-board computing device 720 may use any now or hereafter known object recognition algorithms, video tracking algorithms, and computer vision algorithms (e.g., track objects frame-to-frame iteratively over a number of time periods) to determine the perception.

In some embodiments, the on-board computing device 720 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 720 may perform one or more prediction and/or forecasting operations. For example, the on-board computing device 720 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102, the surrounding environment, and/or their relationship(s). For example, if an object is a vehicle and the current driving environment includes an intersection, the on-board computing device 720 may predict whether the object will likely move straight forward or make a turn. If the perception data indicates that the intersection has no traffic light, the on-board computing device 720 may also predict whether the vehicle may have to fully stop prior to entering the intersection.

In various embodiments, the on-board computing device 720 may determine a motion plan for the autonomous vehicle. For example, the on-board computing device 720 may determine a motion plan for the autonomous vehicle based on the perception data and/or the prediction data. Specifically, given predictions about the future locations of proximate objects and other perception data, the on-board computing device 720 can determine a motion plan for the AV 102 that best navigates the autonomous vehicle relative to the objects at their future locations.

In some embodiments, the on-board computing device 720 may receive predictions and make a decision regarding how to handle objects and/or actors in the environment of the AV 102. For example, for a particular actor (e.g., a vehicle with a given speed, direction, turning angle, etc.), the on-board computing device 720 decides whether to overtake, yield, stop, and/or pass based on, for example, traffic conditions, map data, state of the autonomous vehicle, etc. Furthermore, the on-board computing device 720 also plans a path for the AV 102 to travel on a given route, as well as driving parameters (e.g., distance, speed, and/or turning angle). That is, for a given object, the on-board computing device 720 decides what to do with the object and determines how to do it. For example, for a given object, the on-board computing device 720 may decide to pass the object and may determine whether to pass on the left side or right side of the object (including motion parameters such as speed). The on-board computing device 720 may also assess the risk of a collision between a detected object and the AV 102. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 720 may execute one or more control instructions to perform a cautious maneuver (e.g., mildly slow down, accelerate, change lane, or swerve). In contrast, if the collision cannot be avoided, then the on-board computing device 720 may execute one or more control instructions for execution of an emergency maneuver (e.g., brake and/or change direction of travel).

As discussed above, planning and control data regarding the movement of the autonomous vehicle is generated for execution. The on-board computing device 720 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 8:
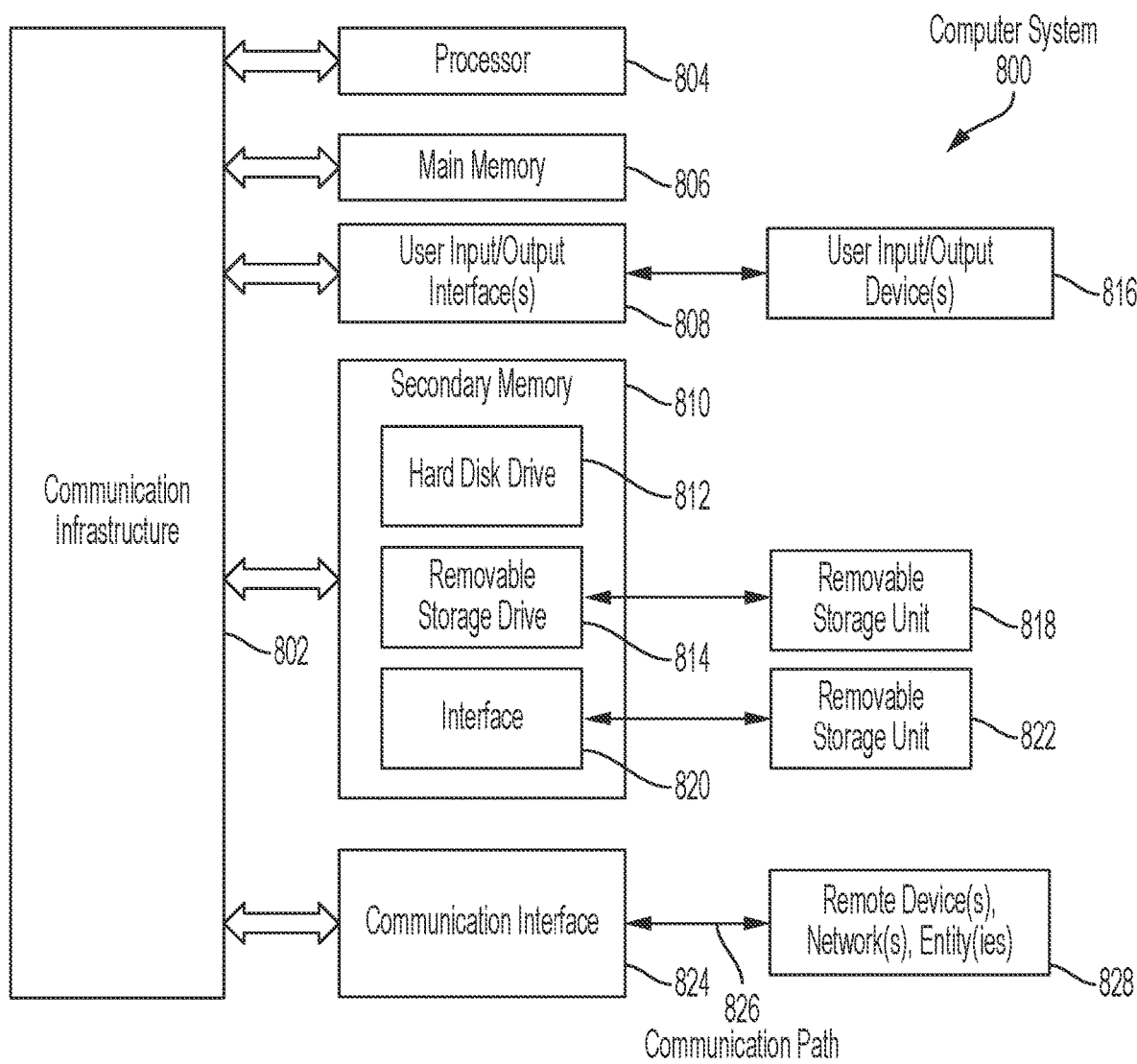
FIG. 8 illustrates an example computer system useful for implementing various embodiments.

Various embodiments can be implemented, for example, using one or more computer systems, such as computer system 800 shown in FIG. 8. Computer system 800 can be any computer capable of performing the functions described in this document.

Computer system 800 includes one or more processors (also called central processing units, or CPUs), such as a processor 804. Processor 804 is connected to a communication infrastructure or bus 802. Optionally, one or more of the processors 804 may each be a graphics processing unit (GPU). In various embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 816, such as monitors, keyboards, pointing devices, etc., that communicate with communication infrastructure 802 through user input/output interface(s) 808.

Computer system 800 also includes a main or primary memory 806, such as random access memory (RAM). Main memory 806 may include one or more levels of cache. Main memory 806 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In various embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 800, main memory 806, secondary memory 810, and removable storage units 818 and 822, as well as tangible articles of manufacture embodying any combination of the foregoing. Such control logic, when executed by one or more data processing devices (such as computer system 800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The terms "wireless communication", "wireless network" and the like refers to communication and systems for communication between devices in which at least a portion of the communication path includes a signal that is transmitted wirelessly, but it does not necessarily require that the entire communication path be wireless.

The term "bounding box" refers to a rectangular box that represents the location of an object. A bounding box may be represented in data by x- and y-axis coordinates [xmax, ymax] that correspond to a first corner of the box (such as the upper right corner), along with x- and y-axis coordinates [xmin, ymin] that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

The invention claimed is:

1. A method of mitigating addition of false object information to a track that provides a spatial description of an object, the method comprising, by a processor:
 accessing a track comprising a plurality of frames of data captured by a sensor system over a time period, in which each frame of the track comprises spatial data representing a detected object;

analyzing a set of at least two sequential frames of the track to determine whether a plurality of specified parameters of the detected object remains consistent over the set of at least two sequential frames in a specified model, the specified model comprising a constant velocity model, a surface model, a constant speed rate model, and a constant course rate model, wherein analyzing the set of at least two sequential frames of the track further includes:

determining whether the plurality of specified parameters of the detected object remain consistent over the sequential frames in the constant velocity model and the surface model;

in response to the plurality of specified parameters of the detected object not remaining consistent over the set of at least two sequential frames in the constant velocity model and the surface model, pruning the track to exclude one or more of the sequential frames from the track; and in response to the plurality of specified parameters of the detected object remaining consistent over the set of at least two sequential frames in the constant velocity model and the surface model:

determining whether the plurality of specified parameters of the detected object remain consistent over the set of at least two sequential frames in the constant course rate model and the constant speed rate model, and in response to the plurality of specified parameters of the detected object not remaining consistent over the set of at least two sequential frames, pruning the track to exclude one or more of the sequential frames from the track.

2. The method of claim 1, wherein, with the specified model being the constant velocity model, analyzing the set of at least two sequential frames further comprises:

comparing a first of the sequential frames and a second of the sequential frames to determine whether the detected object exhibits a position change that does not satisfy the constant velocity model.

3. The method of claim 1, wherein, with the specified model being the constant velocity model, analyzing the set of at least two sequential frames further comprises:

comparing a first of the sequential frames and a second of the sequential frames to determine whether the detected object exhibits a change in speed that does not satisfy the constant velocity model.

4. The method of claim 1, wherein, with the specified model being the constant velocity model, analyzing the set of at least two sequential frames further comprises:

comparing a first of the sequential frames and a second of the sequential frames to determine whether the detected object exhibits a course change that exceeds a course inconsistency threshold for the specified model.

5. The method of claim 1, wherein, with the specified model being the surface model, analyzing the set of at least two sequential frames further comprises:

in each of a first of the sequential frames and a second of the sequential frames, applying a bounding box to the object, wherein a change between a dimension of the bounding box in the first frame and a corresponding dimension of the bounding box in the second frame exceeds an inconsistency threshold for the surface model indicates that the at least two sequential frames do not satisfy the surface model.

6. The method of claim 1, wherein, with the specified model being the constant speed rate model and the specified parameter comprises a rate of change in speed of the object, analyzing the set of at least two sequential frames further comprises:

accessing at least three sequential frames of the track, and calculating the rate of change in speed of the object over the at least three sequential frames, wherein the analyzing indicates that the specified parameter remains consistent over the at least three sequential frames when the rate of change in speed of the object over the at least three sequential frames is less than a speed rate inconsistency threshold, and otherwise indicates that the specified parameter does not remain consistent over the at least three sequential frames.

7. The method of claim 1, wherein with the specified model being the constant course rate model and the specified parameter including a course rate of the object, analyzing the set of at least two sequential frames further comprises:

accessing at least three sequential frames of the track, and calculating the course rate of the object over the at least three sequential frames, wherein the analyzing indicates that the specified parameter remains consistent over the at least three sequential frames when the course rate of the object over the at least three sequential frames is less than a speed rate inconsistency threshold, and otherwise indicates that the specified parameter does not remain consistent over the at least three sequential frames.

8. The method of claim 1, wherein:

the sensor system is a perception system of an autonomous vehicle; and the method further comprises, by the perception system, capturing the sensor data as one or more of the following: radar data, lidar data or camera data.

9. The method of claim 1, wherein pruning the track to exclude the one of the sequential frames from the track comprises either:

modifying the track to delete the excluded one or more frames from the track; or removing the excluded frame from a data stream of the data captured by the sensor system before the excluded one or more frames are saved to the track.

10. The method of claim 9, wherein pruning the track to exclude the one of the sequential frames from the track comprises, when excluding the one or more frames, starting with a most recent frame.

11. A system for mitigating addition of false object information to a track that provides a spatial description of an object, the system comprising:

a processor; and a memory device containing programming instructions that are configured to cause the processor to:

access a track comprising a plurality of frames of data captured by a sensor system over a time period, in which each frame of the track comprises spatial data representing a detected object, analyze a set of at least two sequential frames of the track to determine whether a specified parameter of the detected object remains consistent over the set of at least two sequential frames in a specified model, wherein the specified model comprises a constant velocity model, a surface model, a constant speed rate model, and a constant course rate model, the programming instructions to analyze the set of at least two sequential frames further cause the processor to determine whether a plurality of specified parameters of the detected object remain consistent over the sequential frames in the constant velocity model and the surface model,
in response to the parameter of the detected object not remaining consistent over the set of at least two sequential frames in the constant velocity model and the surface model, prune the track to exclude one or more of the sequential frames from the track, and
in response to the plurality of specified parameters of the detected object remaining consistent over the set of at least two sequential frames in the constant velocity model and the surface model:
determine whether a plurality of specified parameters of the detected object remain consistent over the sequential frames in the constant course rate model and the constant speed rate model, and
in response to the plurality of specified parameters of the detected object not remaining consistent over the sequential frames, prune the track to exclude one or more of the sequential frames from the track.

12. The system of claim 11, wherein, with the specified model being the constant velocity model, the instructions to analyze the set of at least two sequential frames further cause the processor to do one or more of the following:
compare a first of the sequential frames and a second of the sequential frames to determine whether the detected object exhibits a position change that does not satisfy the constant velocity model;
compare a first of the sequential frames and a second of the sequential frames to determine whether the detected object exhibits a change in speed that does not satisfy the constant velocity model; or
compare a first of the sequential frames and a second of the sequential frames to determine whether the detected object exhibits a course change that exceeds a course inconsistency threshold for the specified model.

13. The system of claim 11, wherein, with the specified model being the surface model, the instructions to analyze the set of at least two sequential frames further cause the processor to:
in each of a first of the sequential frames and a second of the sequential frames, apply a bounding box to the object; and
determine that the at least two sequential frames do not satisfy the surface model if a change between a dimension of the bounding box in the first frame and a corresponding dimension of the bounding box in the second frame exceeds an inconsistency threshold for the surface model, otherwise determine that the at least two sequential frames satisfy the surface model.

14. The system of claim 11, wherein, with the specified model being the constant speed rate model and the specified parameter comprises a rate of change in speed of the object, the instructions to analyze the set of at least two sequential frames further cause the processor to:
access at least three sequential frames of the track;
calculate the rate of change in speed of the object over the at least three sequential frames; and
determine that the specified parameter remains consistent over the at least three sequential frames if the rate of change in speed of the object over the at least three sequential frames is less than a speed rate inconsistency threshold, otherwise determine that the specified parameter does not remain consistent over the at least three sequential frames.

15. The system of claim 11, wherein, with the specified model being a constant course rate model and the specified parameter comprises a course rate of the object, the instructions to analyze the set of at least two sequential frames further causes the processor to:
access at least three sequential frames of the track;
calculate the course rate of the object over the at least three sequential frames; and
determine that the specified parameter remains consistent over the at least three sequential frames if the course rate of the object over the at least three sequential frames is less than a speed rate inconsistency threshold, otherwise determine that the specified parameter does not remain consistent over the at least three sequential frames.

16. The system of claim 11, wherein the sensor system is an autonomous vehicle perception system that is configured to capture the sensor data as one or more of the following: radar data, lidar data or camera data.

17. The system of claim 11, wherein the instructions to prune the track to exclude the one of the sequential frames from the track comprise instructions to either:
modify the track to delete the excluded one or more frames from the track; or
remove the excluded frame from a data stream of the data captured by the sensor system before the excluded one or more frames are saved to the track.

18. A non-transitory computer readable medium including instructions for causing one or more processors to perform operations comprising:
access a track comprising a plurality of frames of data captured by a sensor system over a time period, in which each frame of the track comprises spatial data representing a detected object;
analyze a set of at least two sequential frames of the track to determine whether a specified parameter of the detected object remains consistent over the set of at least two sequential frames in a specified model, wherein the specified model comprises a constant velocity model, a surface model, a constant speed rate model, and a constant course rate model, to analyze the set of at least two sequential frames, the instructions further cause the processor to determine whether a plurality of specified parameters of the detected object remain consistent over the sequential frames in the constant velocity model and the surface model; and
in response to the parameter of the detected object not remaining consistent over the set of at least two sequential frames in the constant velocity model and the surface model, prune the track to exclude one or more of the sequential frames from the track;
in response to the plurality of specified parameters of the detected object remaining consistent over the set of at least two sequential frames in the constant velocity model and the surface model:
determine whether a plurality of specified parameters of the detected object remain consistent over the sequential frames in the constant course rate model and the constant speed rate model, and
in response to the plurality of specified parameters of the detected object not remaining consistent over the sequential frames, prune the track to exclude one or more of the sequential frames from the track.

* * * * *